July 2, 1957  S. SHAPIRO  2,797,712
METHOD OF MAKING WOVEN FABRIC TEST STRIPS OF UNIFORM WIDTH
Filed March 12, 1954
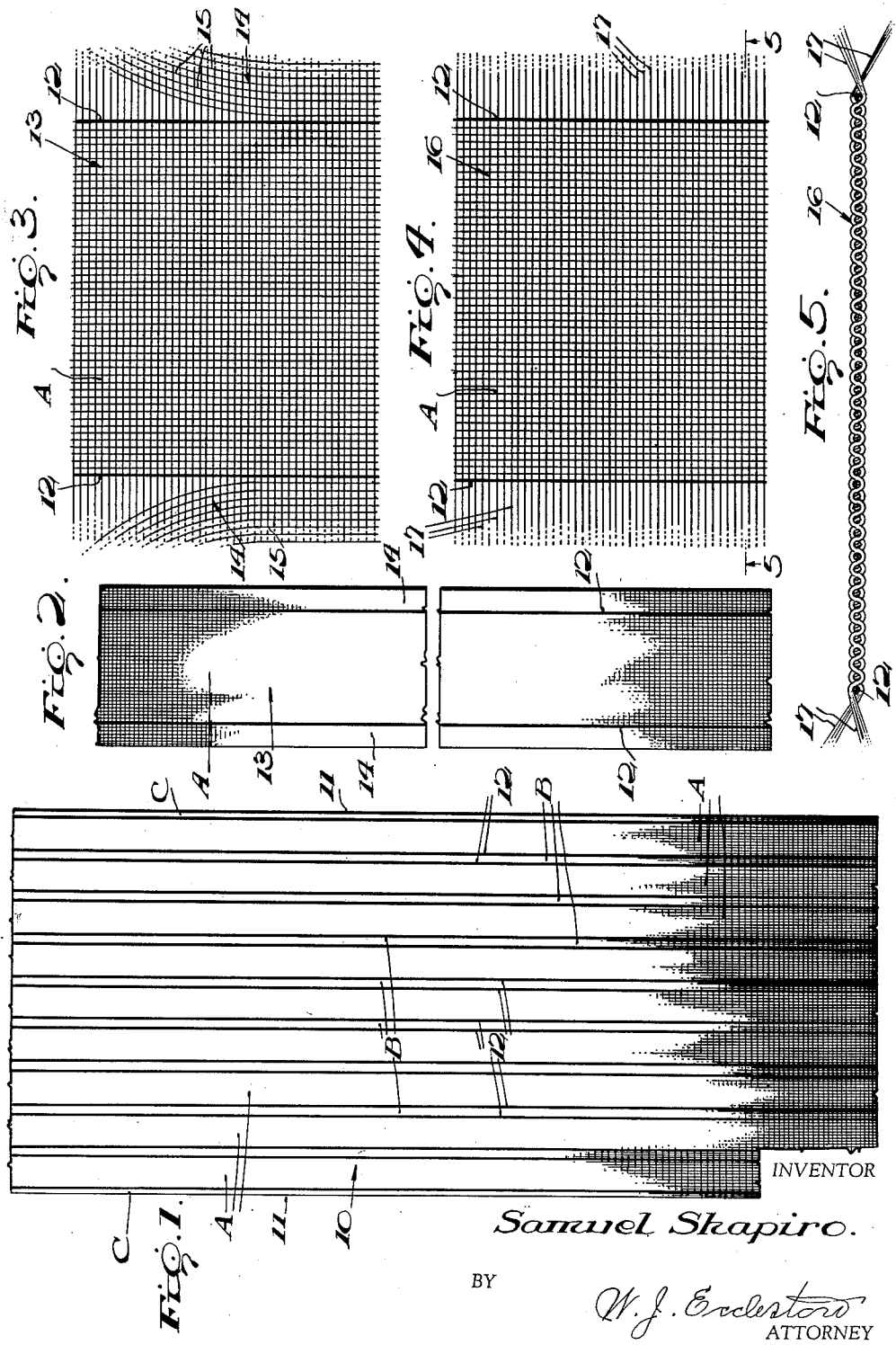
INVENTOR
Samuel Shapiro.
BY
ATTORNEY United States Patent Office 2,797,712
Patented July 2, 1957

2,797,712

METHOD OF MAKING WOVEN FABRIC TEST STRIPS OF UNIFORM WIDTH

Samuel Shapiro, Washington, D. C.

Application March 12, 1954, Serial No. 415,991

2 Claims. (Cl. 139—383)

(Granted under Title 35, U. S. Code (1952), sec. 266)

The invention described herein, if patented, may be manufactured and used by or for the Government for governmental purposes, without the payment to me of any royalty thereon.

The present invention relates broadly to weaving, and more particularly to woven fabric test strips and to a method of making the test strips from a specially prepared woven fabric sheet.

Government testing laboratories are presently engaged in studying the effects of micro-biological degradation, weathering, etc., upon woven fabrics, such as woven cotton duck. Tests are conducted to determine the loss of tensile strength in the woven fabrics, after their subjection to the elements over long periods of time, or to the effects of bacteria, fungi or the like.

These tests require the preparation of large numbers of woven fabric test strips of exactly defined uniform width, and the procedure presently followed for making the test strips is laborious, tedious and time consuming. For example, fabric test strips measuring one inch in width across the warp threads of the strips are prepared by ruling off areas or bands on a large section of woven fabric. The ruled off areas are approximately one and one-half inches wide. The fabric is then severed along the ruled lines to provide oversize strips, approximately one and one-half inches wide. Warp threads are then removed from either side of the oversize strip until the strip measures one inch in width across the remaining warp threads. The final width of the fabric test strip is measured with a ruler, and the process is slow and tedious. Frequently, the personnel available for carrying out the procedure is not sufficiently reliable to make the necessary measurements, and it has been determined that a completed fabric test strip which differs in width by only one warp thread, from the correct number of warp threads will cause an error of approximately 2% in the subsequent tensile strength tests to which the test strips are subjected. With personnel of average skill, the above described procedure for making the test strips yields a production of only about 30 satisfactory test strips per hour.

Accordingly, this invention has for its principal object the provision of a method whereby a greatly increased number of test strips may be rapidly prepared by unskilled personnel, without the likelihood of any inaccuracy in the width of the finished test strips.

A further object of the invention is to provide woven fabric test strips of uniform exactly pre-determined widths, the manner of preparing the strips being such that they may be formed and inspected for accuracy of width without the use of a ruler or the like for measuring the test strips or drawing lines upon the fabric from which they are formed.

Another object is to obtain fabric test strips of pre-determined uniform width, the final width of the test strips being based on pre-determined definite numbers of warp threads in the test strips, and not upon a measurement made with a ruler or the like.

A further object is to provide a method of making woven fabric test strips having their longitudinal edges defined by a single pair of colored warp threads, which contrast with the other threads, colored or uncolored making up the body portion of the test strips.

A further object is to provide woven fabric test strips of the above-mentioned character which may have their widths checked or inspected at a glance, without the necessity of measuring the width of the test strips with a ruler or the like.

Still another object is to provide a woven fabric for use in making the test strips and embodying therein a plurality of colored warp threads, woven into the fabric at regularly spaced intervals across its width, and serving to facilitate the preliminary cutting of oversize test strips from the fabric, and later indicating the exact finished width of the test strips, when they are visually inspected, subsequent to removing the excess warp threads from the oversize strips outwardly of the colored warp threads.

Other objects and advantages of the invention will be apparent during the course of the following description.

In the accompanying drawings, forming a part of this application, and in which like numerals are employed to designate like parts throughout the same, Figure 1 is a plan view, partly diagrammatic, of woven fabric used in the preparation of the test strips in accordance with my method, Figure 2 is an enlarged fragmentary plan view of an oversize or uncompleted test strip cut from the fabric shown in Figure 1, Figure 3 is a further enlarged fragmentary plan view of the oversize test strip and showing the removal or unraveling of certain marginal warp threads upon the outer sides of the colored warp threads which serve as boundaries of the completed test strip, Figure 4 is a similar view of the completed test strip after removal of the excess warp threads, and, Figure 5 is an enlarged transverse vertical section taken on line 5—5 of Figure 4.

Briefly, the invention comprises weaving a section of fabric having included therein at regularly spaced intervals across the width thereof or across the warp threads a number of single colored warp threads which contrast in color with the other threads making up the fabric. These colored warp threads define a plurality of areas or bands of uniform width running longitudinally of the fabric or in the direction of the warp threads. The said bands of uniform width in the fabric are spaced apart a relatively small distance to provide areas between the bands within which the fabric is severed to form a number of oversize fabric test strips. These oversize strips then have the warp threads removed or unraveled therefrom in their regions outwardly of the single pair of colored warp threads included in the oversize strips for producing the finished test strips of the desired width, and containing a pre-determined number of warp threads, including the colored warp threads which define the longitudinal margins of the test strips.

Referring to the drawings, the numeral 10 designates woven fabric, such as woven cotton duck or the like, which it is desired to test for tensile strength, after subjection to the action of bacteria, weathering or the like. The woven fabric is preferably uncolored or white, although it may be a colored fabric if preferred. The fabric 10 may be woven in any desired width, and may be of any length preferred. The fabric 10 embodies the usual warp and weft threads, and has the usual selvage edges 11, extending in the direction of the warp threads, as is well known.

The fabric 10 has woven therein at regularly spaced intervals across its width in the weft direction a plurality of uniformly spaced pairs of parallel colored warp threads 12, extending throughout the entire length of the fabric, and defining a plurality of areas or bands A of pre-determined uniform width. The loom which weaves the fabric 10 may be set up or adjusted to weave the colored warp threads 12 into the fabric at exactly defined regular intervals, so that if the fabric 10 has, for example, 50 warp threads per inch of width, each pair of colored warp threads 12 defining each area A may be placed exactly 50 threads apart. That is to say, each area or band A of the fabric will consist of exactly 50 warp threads, including the two colored warp threads 12, and the band A will measure exactly one inch in width, including the two colored warp threads. The colored warp threads 12 may be of any desired color to contrast with the other uncolored or colored warp and weft threads embodied in the fabric 10, although it is preferred to have the body portion of the fabric 10 uncolored or white, and to use a bright contrasting color such as bright red for the colored warp threads 12.

The areas or bands A in the fabric 10 are likewise spaced apart uniformly, throughout the entire width of the fabric to provide relatively narrow areas or bands B of fabric between the areas A. The bands B may be, for example, about 3/8 of an inch wide in the weft direction, although this width may be varied somewhat, as desired. The bands B likewise extend longitudinally of the fabric throughout its entire length. The purpose of the bands B is to provide space between adjacent bands A for cutting or severing the fabric into a plurality of oversize fabric strips 13, of approximately uniform width, each oversize strip 13 embodying one of the areas A bounded longitudinally by a pair of the colored warp threads 12. Each oversize strip 13 likewise comprises a pair of marginal longitudinal portions 14, of approximately one-half the width of one of the bands B, or approximately 3/16 of an inch in width, where the bands B are 3/8 of an inch wide, and the bands A are exactly one inch wide, for example. Each of the side marginal portions 14 will of course embody an inexact number of warp threads, arranged laterally outwardly of the single pair of colored warp threads 12 contained in the oversize strip 13. It is to be noted that the strips 13 will have no selvage edges, since they have been cut or severed from the fabric 10 inwardly of its selvage edges 11. It should also be mentioned here that in order to utilize substantially the entire width of the fabric 10, without wasting fabric, the outermost pair of areas or bands A are arranged quite close to the selvage edges 11, and the overall width of the fabric 10 is such that a given number of the bands A and B may be formed therein in a manner to utilize substantially the entire width of the fabric 10, as shown in Figure 1. In the severing of the oversize strips 13, the narrow areas C, adjacent to the outermost pair of bands A are likewise severed or cut inwardly of the selvage edges 11, to remove the selvage edges, the other severing of the fabric being performed in the relatively narrow areas B, as previously stated. The areas B and C are made sufficiently wide to enable rapid cutting of the fabric 10 into the strips 13, without the likelihood of the operator cutting or severing any of the colored warp threads 12. It is believed that approximately 3/8 of an inch width for the areas or bands B and C is sufficient for this purpose.

When the fabric has been severed completely to provide a number of the oversize strips 13, these strips are treated individually by removing or unraveling therefrom the warp threads 15 contained in the longitudinal marginal portions 14, outwardly of the pair of colored warp threads 12, see Figure 3. All of the warp threads 15 contained in the marginal portions 14 are entirely removed from the fabric strips 13, up to but not including the colored warp threads 12. This operation may be performed very rapidly by hand, and is not difficult.

When the excess warp threads 15 have been removed, the completed or finished fabric test strips 16 are provided, and no further work need be done upon the test strips, except to inspect the same visually. The inspector need only glance at each completed test strip 16, to observe the presence of the two marginal colored warp threads 12. If there are no uncolored warp threads present in the strips 16, outwardly of the colored warp threads 12, and if both colored warp threads 12 are present, the inspector knows that the test strips 16 are satisfactory. No measuring of the widths of the test strips 16 with a ruler or the like is necessary. If either of the colored warp threads 12 are not present in the strips 16, or if both colored warp threads are not present, the inspector knows at a glance that the test strips 16 are too narrow, due to the removal of too many warp threads. Likewise, if any of the uncolored warp threads 15 outwardly of the colored warp threads 12 are present, the inspector knows at a glance that the fabric strips 16 are too wide, because not enough of the warp threads have been unraveled. Where the finished test strips 16 are properly formed, with their opposite longitudinal margins defined by the single pair of colored warp threads 12, the inspector is assured that the width of each strip 16 between the colored warp threads 12 is an exact dimension, say one inch, where the farbic is woven with 50 warp threads per inch, for example, and the first and 50th thread is one of the colored warp threads 12. The width of the strip 16 between the colored warp threads 12 will also be uniform, throughout the entire length of the strip 16.

It may be noted that all of the weft threads 17 remain in the fabric test strip 16, after completion of the same, and these project somewhat beyond the marginal colored warp threads 12 as a fringe. The portions of the weft threads 17 outwardly of the colored warp threads 12 serve no purpose in the test strip 16, but they do not interfere in any way with the tensile testing of the test strips, which is always done in the warp direction. As previously stated, the finished test strips 16 have no selvage edges to introduce errors in the test results.

My method thus provides woven fabric test strips of exactly pre-determined uniform width, throughout their entire lengths, and the long test strips 16 may of course be cut transversely into any desired number of lengths for test purposes. While I have mentioned the woven fabric 10 as containing 50 warp threads per inch of width, in connection with my method and the test strips made therefrom, it should be understood that I do not propose to limit the invention to any particular number of warp or weft threads per inch, and the number of threads per inch may be varied as desired. Further, my method is applicable to any type of woven fabric, other than woven cotton duck, and this particular fabric has been mentioned merely as an example. The true purpose of the invention is to provide a method for making test strips from substantially any type of woven fabric upon which it is desired to run tensile strength tests in the warp direction, and the fabric employed for making the test strips should be identical in all respects with a standard or production sample of the particular fabric under test, except that the test fabric will embody the regularly spaced colored warp threads 12, which may not be present in the standard or production fabric.

I have found that may method will reduce the time required to prepare a given number of test strips at least 75%, as compared to the time necessary to produce the test strips in accordance with present practice, and the method will increase by as much as 200% the production of accurate and uniform test strips, as compared to the production afforded by the present practice of making the test strips. The test strips made in accordance with my method are substantially perfect, in that they are of exactly defined and uniform width, whereas, the strips made in accordance with present practices are only as accurate as the ability of the personnel to measure their widths with a ruler or the like while making the same. Also, as is now evident, it is unnecessary to rule or draw lines upon the fabric 10 prior to cutting the same, as the presence of the colored warp threads 12 eliminates the necessity for this. The method is very simple, and involves a minimum of work and fatigue on the part of the personnel practicing it, and the resulting test strips 16 are ideal for their intended purpose.

It is to be understood that the form of the invention, herewith shown and described is to be taken as a preferred example of the same, and that various changes in the shape, size and arrangement of parts may be resorted to, as well as slight changes in the method steps performed, without departing from the spirit of the invention or the scope of the subjoined claims.

I claim:

1. A method of preparing woven fabric test strips from woven fabric having warp threads of one color and having pairs of warp threads of a contrasting color woven therein, said contrasting warp threads being substantially of the same thickness as the warp threads of said first-named color, said pairs of contrasting warp threads being spaced apart uniformly transversely of the fabric by a plurality of warp threads of said first-named color, the warp threads of each pair of said contrasting warp threads being spaced to define between said contrasting threads an area of predetermined uniform width in the fabric in the direction of the warp threads of the fabric, the area between adjacent pairs of contrasting warp threads being substantially narrower than the area between the threads of each pair of contrasting warp threads, comprising severing the fabric in the areas between adjacent pairs of said warp threads of constrasting color to form fabric strips containing a pair of the warp threads of contrasting color and additional warp threads near the margins of the strips outwardly of said warp threads of contrasting color, and then removing all of the warp threads near the margins of the strips outwardly of said warp threads of contrasting color to the boundary indicated by the warp threads of contrasting color, whereby completed fabric test strips are formed having their longitudinal margins defined by a pair of warp threads of contrasting color.

2. A method of preparing woven fabric test strips from woven fabric having warp threads of one color and having pairs of warp threads of a contrasting color woven therein, said contrasting warp threads being substantially of the same thickness as the warp threads of said first-named color, said pairs of contrasting warp threads being spaced apart uniformly transversely of the fabric by a plurality of warp threads of said first-named color, the warp threads of each pair of said contrasting warp threads being spaced to define between said contrasting threads an area of predetermined uniform width in the fabric in the direction of the warp threads of the fabric, the areas between adjacent pairs of contrasting warp threads being of equal width throughout the fabric and substantially narrower than the areas between the threads of each of the pairs of contrasting warp threads, comprising severing the fabric in the areas between adjacent pairs of said warp threads of contrasting color to form fabric strips containing a pair of the warp threads of contrasting color and additional warp threads near the margins of the strips outwardly of said warp threads of contrasting color, and then removing all of the warp threads near the margins of the strips outwardly of the warp threads of contrasting color but not including the warp threads of contrasting color, whereby completed fabric test strips are formed having their longitudinal margins defined by a pair of warp threads of contrasting color.

References Cited in the file of this patent

UNITED STATES PATENTS

| | | |
|---|---|---|
| 783,280 | Jagers | Feb. 21, 1905 |
| 835,083 | Strahl | Nov. 6, 1906 |
| 2,141,386 | Habib | Dec. 27, 1938 |